US012787094B2

(12) United States Patent
Sanders et al.

(10) Patent No.: US 12,787,094 B2

(45) Date of Patent: Nov. 3, 2026

(54) SYSTEMS AND METHODS FOR ADVANCED REDCAP USER EQUIPMENT IN A WIRELESS NETWORK

(71) Applicant: Verizon Patent and Licensing Inc., Basking Ridge, NJ (US)

(72) Inventors: Susan Wu Sanders, Bridgewater, NJ (US); Mezmure Dargie, Atlanta, GA (US); Sudhir Patel, Boonton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 18/653,350

(22) Filed: May 2, 2024

(65) Prior Publication Data

US 2025/0344274 A1 Nov. 6, 2025

(51) Int. Cl.
*H04W 76/16* (2018.01)
*H04L 5/00* (2006.01)

(52) U.S. Cl.
CPC ........... *H04W 76/16* (2018.02); *H04L 5/0035* (2013.01); *H04L 5/0094* (2013.01)

(58) Field of Classification Search
CPC ..... H04W 76/15; H04W 76/18; H04W 48/18; H04W 88/06
See application file for complete search history.

(56) References Cited

U.S. PATENT DOCUMENTS

| | | | | |
|---|---|---|---|---|
| 2021/0352569 | A1* | 11/2021 | Koskinen | H04W 48/02 |
| 2022/0279619 | A1* | 9/2022 | Wu | H04W 76/27 |
| 2023/0036966 | A1* | 2/2023 | Agarwal | H04W 36/00226 |
| 2023/0189371 | A1* | 6/2023 | Ahmad | H04W 76/15 370/328 |
| 2024/0414600 | A1* | 12/2024 | Lyazidi | H04W 36/0022 |

OTHER PUBLICATIONS

Third Generation Partnership Project, "New WID on support of reduced capability NR devices," 3GPP RP-202933, available at https://www.3gpp.org/ftp/tsg_ran/TSG_RAN/TSGR_90e/Info_for_workplan/new_approved_WID_19/RAN1_3/RP-202933.zip (2020).

* cited by examiner

*Primary Examiner* — Rushil P. Sampat

(57) ABSTRACT

A device may include a first set of wireless communication hardware that implements a first radio access technology ("RAT"), such as a Fifth Generation ("5G") RAT, and a second set of wireless communication hardware that implements a second RAT, such as a Long-Term Evolution ("LTE") RAT. The device may detect a wireless broadcast, via the first set of wireless communication hardware, that has been transmitted by a first base station, and may connect, based on a connection request that includes a Reduced Capability ("RedCap") indication, to the first base station, which may implement radio parameters based on the RedCap indication. The device may detect a second wireless broadcast, via the second set of wireless communication hardware, that has been transmitted by a second base station, and may connect to the second base station. The second base station may implement radio resource parameters for the device based on network-maintained information.

21 Claims, 11 Drawing Sheets

SYSTEMS AND METHODS FOR ADVANCED REDCAP USER EQUIPMENT IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Certain types of UEs, such as Reduced Capability ("RedCap") UEs, may be low-cost, low-power consumption devices with limited features, such as limited bandwidth capabilities as compared to other types of UEs such as enhanced mobile broadband ("eMBB") UEs, massive machine-type communication ("mMTC") UEs, Ultra-Reliable and Low Latency communication ("URLLC") UEs, etc.

DETAILED DESCRIPTION OF EXAMPLE EMBODIMENTS

The following detailed description refers to the accompanying drawings. The same reference numbers in different drawings may identify the same or similar elements.

RedCap UEs may be low-cost, low-complexity devices that may be purpose-built to serve as, for example, smart home sensors, e-reading devices, wearable devices, industrial sensors, gaming peripherals, etc. Compared to other types of UEs (e.g., eMBB UEs, URLLC UEs, etc.), RedCap UEs may feature fewer wireless radios, transceivers, or the like. Such UEs may be able to communicate with wireless networks that operate according to one radio access technology ("RAT"), such as a Fifth Generation ("5G") RAT, a New Radio ("NR") RAT, etc. (referred to herein as "5G RAT" for the sake of brevity), but may lack the hardware capability to communicate with other RATs, such as a Long-Term Evolution ("LTE") RAT.

Some wireless networks may implement an NSA architecture, in which an LTE base station (e.g., an evolved Node B ("eNB")) of an LTE RAN serves as an "anchor" for one or more 5G base stations (e.g., Next Generation Node Bs ("gNBs")). In such architectures, the eNB may broadcast system control messages (e.g., Master Information Blocks ("MIBs"), System Information Blocks ("SIBs"), etc.) that may allow for the eNB to be detected by UEs that operate according to an LTE RAT. In some NSA architectures, a 5G RAN (e.g., gNBs) may not broadcast such system control messages. In the course of communicating with the eNB, the eNB may provide information (e.g., synchronization information, control information, etc.) to a UE based on which the UE may detect and communicate with a gNB for which the eNB serves as an anchor.

For RedCap UEs that do not implement an LTE RAT (e.g., which do not include wireless radios, transceivers, etc. that are able to wirelessly communicate with one or more eNBs), such RedCap UEs may be unable to detect and communicate with gNBs in an NSA architecture. For example, since gNBs in an NSA architecture may not broadcast system messages, detection of such gNBs may be dependent on information provided by eNBs which operate at the LTE RAT, and RedCap UEs lacking the capability to communicate according to the LTE RAT may thus be unable to detect and receive wireless connectivity from gNBs according to a 5G RAT.

Embodiments described herein provide for an Advanced RedCap ("ARC") UE, which meets thresholds, requirements, etc. associated with a RedCap category of UEs, while achieving the functionality to communicate via multiple RATs (e.g., a 5G RAT and an LTE RAT), as well as with multiple different 5G deployment architectures (e.g., a Standalone ("SA") architecture and an NSA architecture).

Figure 1:
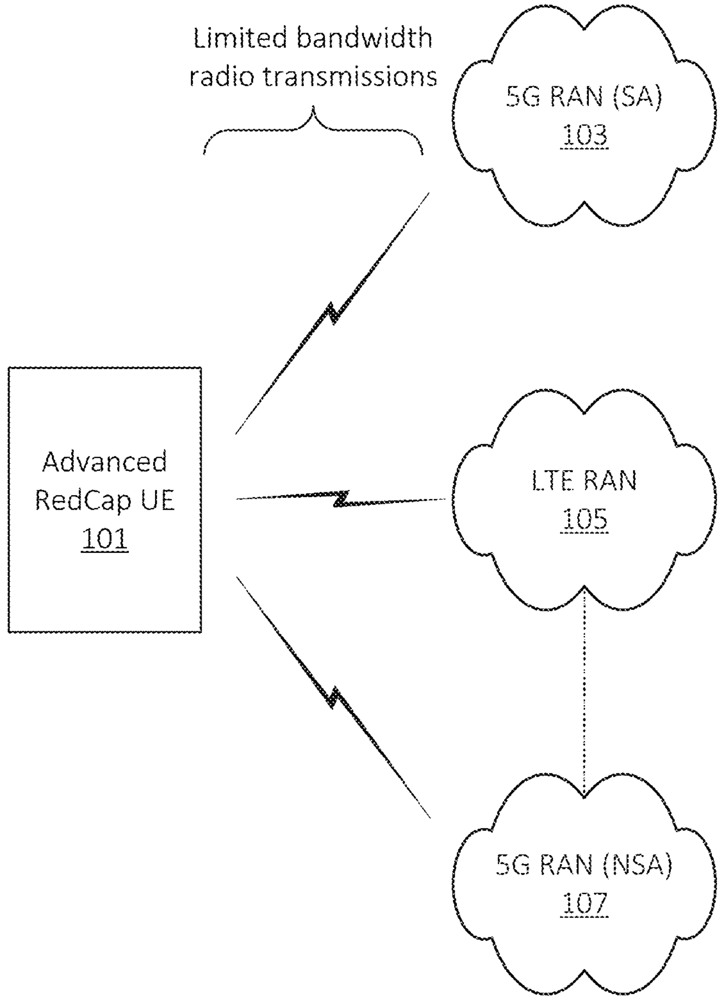
FIG. 1 illustrates an example overview of one or more embodiments described herein.

For example, as shown in FIG. 1, and as described in further detail below, ARC UE 101 may have the capability to communicate with RANs of multiple RATs and architectures, such as 5G RAN 103, LTE RAN 105, and 5G RAN 107. 5G RAN 103 may implement an SA architecture, in which base stations of 5G RAN 103 (e.g., gNBs) may broadcast system information (e.g., MIBs, SIBs, and/or other suitable information) that may be used by UEs to detect the presence of such gNBs and ultimately connect to 5G RAN 103. LTE RAN 105 and 5G RAN 107 may implement an NSA architecture, in which base stations of LTE RAN 105 (e.g., eNBs) broadcast system information that may be used by UEs to detect the presence of such eNBs as well as the presence of base stations (e.g., gNBs) of 5G RAN 107.

Figure 2:
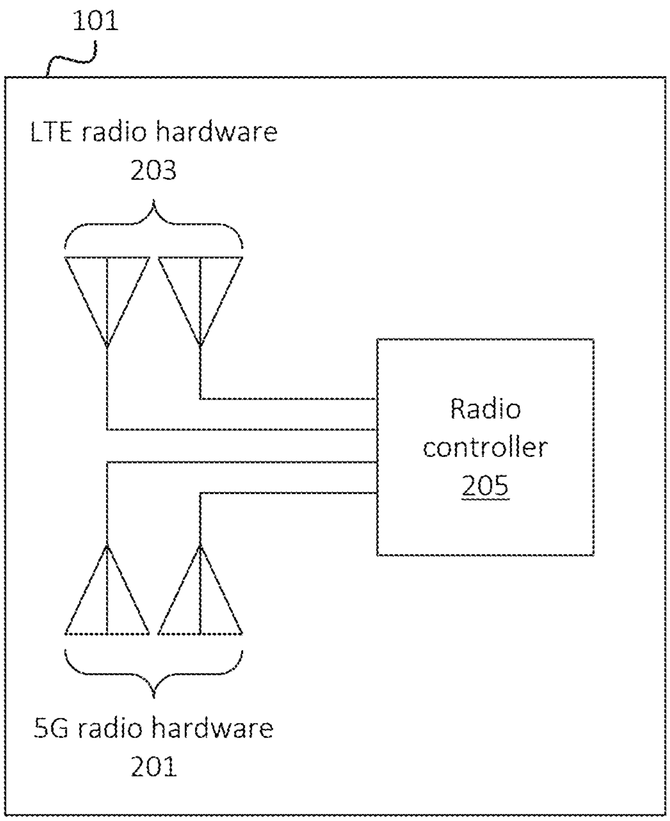
FIG. 2 illustrates example components of one or more devices, in accordance with some embodiments.

The wireless communications between ARC UE 101 and RANs 103, 105, and 107 may be of limited bandwidth due to, for example, a limited set of wireless communication hardware implemented by ARC UE 101 in order to conform to or satisfy specifications, standards, parameters, etc. associated with a "RedCap" category of UEs. For example, as shown in FIG. 2, ARC UE 101 may implement a particular quantity or amount of wireless communication hardware such as antennas, transceivers, etc. that are specified as qualifying for the RedCap category of UEs. In some embodiments, the wireless communication hardware that is implemented by ARC UE 101 and that satisfies specifications associated with the RedCap category of UEs may include a particular quantity or type of 5G antennas, radios, transceivers, etc. For example, 5G radio hardware 201 of ARC UE 101 may include a quantity or type of antennas, radios, receivers, transmitters, transceivers, chipsets, modems, or the like that satisfy one or more thresholds, parameters, specifications, etc. associated with the RedCap category of UEs. UE 101 may utilize 5G radio hardware 201 to communicate with 5G RANs (e.g., 5G RANs 103 and/or 107).

In accordance with some embodiments, ARC UE 101 may also include a set of LTE radio hardware 203, which may include one or more antennas, radios, receivers, transmitters, transceivers, chipsets, modems, or the like. ARC UE 101 may utilize LTE radio hardware 203 to communicate with LTE RANs (e.g., LTE RAN 105).

ARC UE 101 may further include radio controller 205, which may serve as an interface between radio hardware of ARC UE 101 (e.g., 5G radio hardware 201 and/or LTE radio hardware 203) and processing hardware, an operating system, a kernel, and/or other elements of ARC UE 101. As discussed below, radio controller 205 may facilitate the connectivity of ARC UE 101 with 5G RAN 103, LTE RAN 105, and/or 5G RAN 107. In some embodiments, radio controller 205 may facilitate such connectivity in accordance with RedCap specifications (e.g., limited bandwidth radio transmissions to and/or from ARC UE 101). For example, as discussed herein, such specifications may be identified and enforced by 5G RAN 103, LTE RAN 105, and/or 5G RAN 107. For example, 5G RANs 103 and 107 may communicate with ARC UE 101 in accordance with bandwidth limits or other parameters associated with the RedCap category. Further, in some embodiments, LTE RAN 105 may communicate with ARC UE 101 in accordance with bandwidth limits or other parameters associated with the RedCap category, and/or otherwise associated with particular parameters of LTE radio hardware 203 of ARC UE 101.

Figure 3:
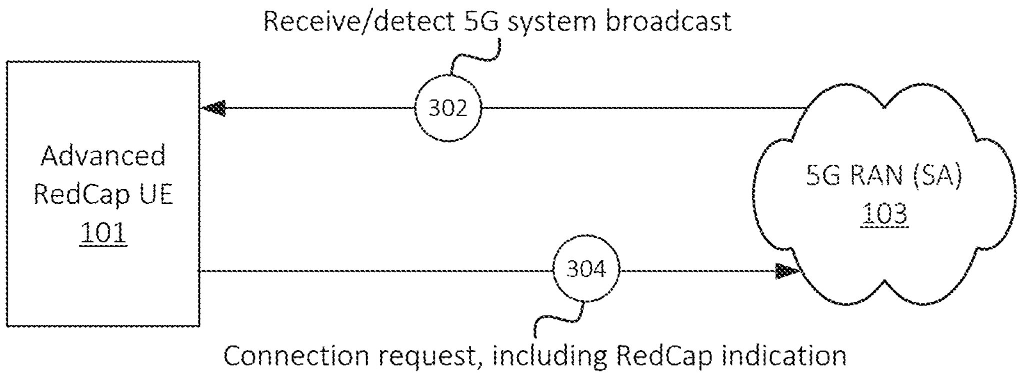
FIG. 3 illustrates an example of an Advanced RedCap UE connecting to a radio access network ("RAN") based on a RedCap indication provided by the UE during a connection procedure, in accordance with some embodiments.

FIG. 3 illustrates an example of ARC UE 101 connecting to 5G RAN 103 in accordance with a RedCap category. As shown, 5G RAN 103 (e.g., one or more gNBs of 5G RAN 103) may broadcast information that may be used to detect 5G RAN 103, such as system broadcast messages (e.g., SIBs, MIBs, etc.). ARC UE 101 may receive or otherwise detect (at 302) the system messages broadcasted by 5G RAN 103. For example, 5G radio hardware 201 of ARC UE 101 may operate at the same RAT, frequency, band, sub-band, etc. as 5G RAN 103, and ARC UE 101 (e.g., radio controller 205) may accordingly detect the system messages broadcasted by 5G RAN 103.

Based on detecting (at 302) the system messages from 5G RAN 103 and/or based on one or more other factors (e.g., a determination by radio controller 205 that signal strength or quality metrics between ARC UE 101 and 5G RAN 103 are higher than signal strength or quality metrics between ARC UE 101 and another RAN or another portion of 5G RAN 103, or other factors), ARC UE 101 may output (at 304) a connection request to 5G RAN 103. The connection request may include, for example, one or more Radio Resource Control ("RRC") messages, one or more Non-Access Stratum ("NAS") messages (e.g., which may be received by an access control element of 5G RAN 103, such as an Access and Mobility Management Function ("AMF")), etc. In some embodiments, the connection request (e.g., RRC signaling, NAS signaling, etc.) may include an indication that ARC UE 101 is associated with a RedCap category of UEs.

5G RAN 103 may perform authentication procedures, authorization procedures, and/or other procedures in the course of establishing the requested connection (e.g., one or more radio bearers) between ARC UE 101 and 5G RAN 103. In some embodiments, as part of the connection establishment procedure, 5G RAN 103 may configure parameters of the connection between ARC UE 101 and 5G RAN 103 based on the RedCap indication. For example, a scheduler or other element of 5G RAN 103 may schedule or otherwise allocate radio resources (e.g., Physical Resource Blocks ("PRBs"), Resource Elements ("REs"), etc.) based on bandwidth limits or other parameters associated with the RedCap category of UEs. In this manner, 5G RAN 103 may avoid over-allocating resources for ARC UE 101, thus conserving radio resources of 5G RAN 103 and avoiding overloading ARC UE 101 with more transmissions than ARC UE 101 has the capability to receive via 5G radio hardware 201.

Figure 4:
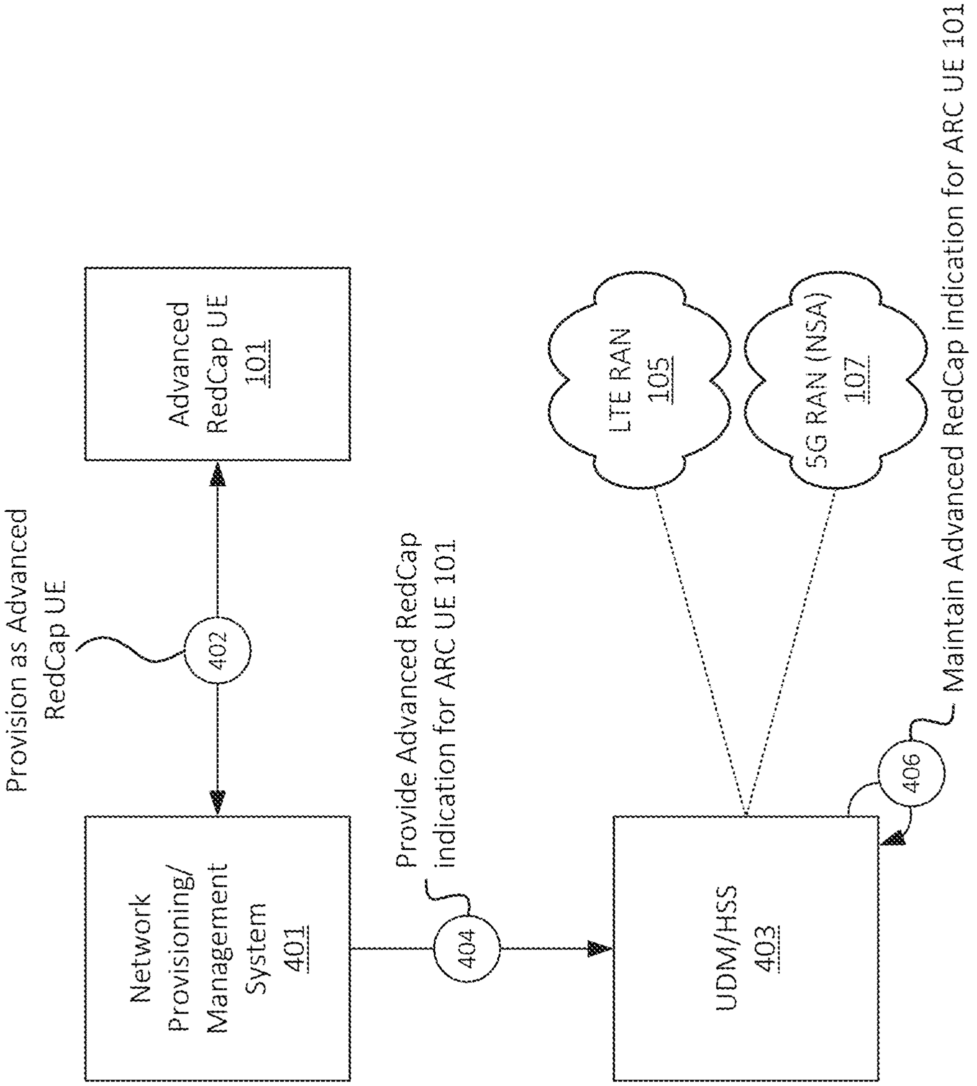
FIG. 4 illustrates an example of network-maintained information associating a device with an Enhanced RedCap category, in accordance with some embodiments.
Figure 5:
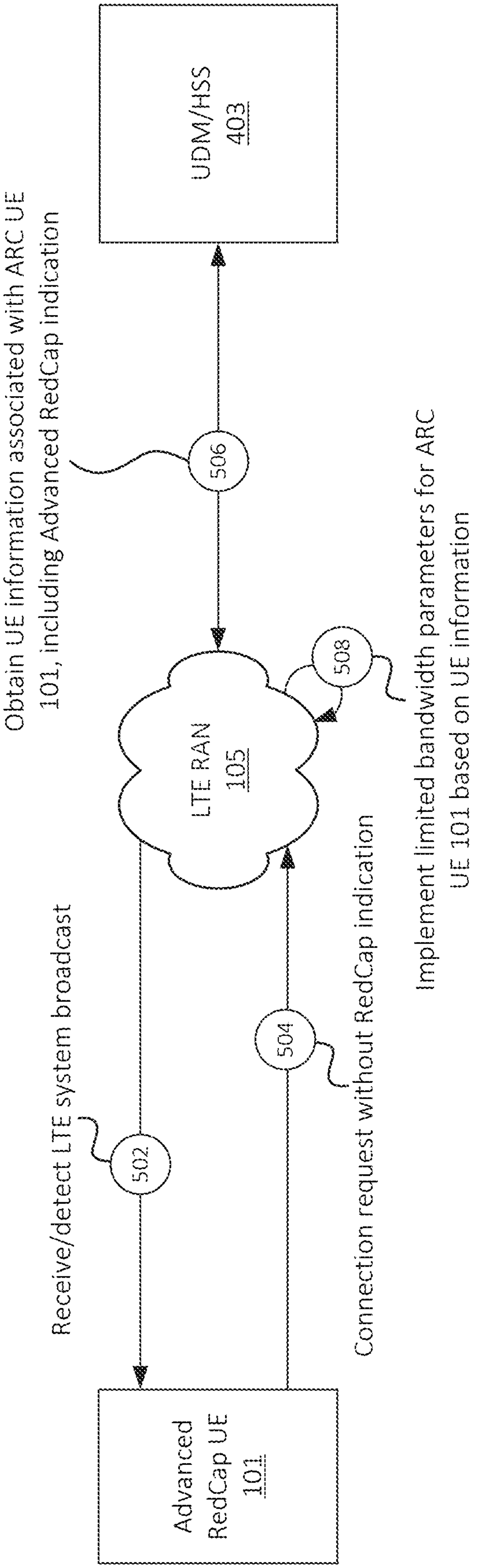
FIG. 5 illustrates an example of an Advanced RedCap UE connecting to a RAN without providing a RedCap indication during a connection procedure, in accordance with some embodiments.
Figure 6:
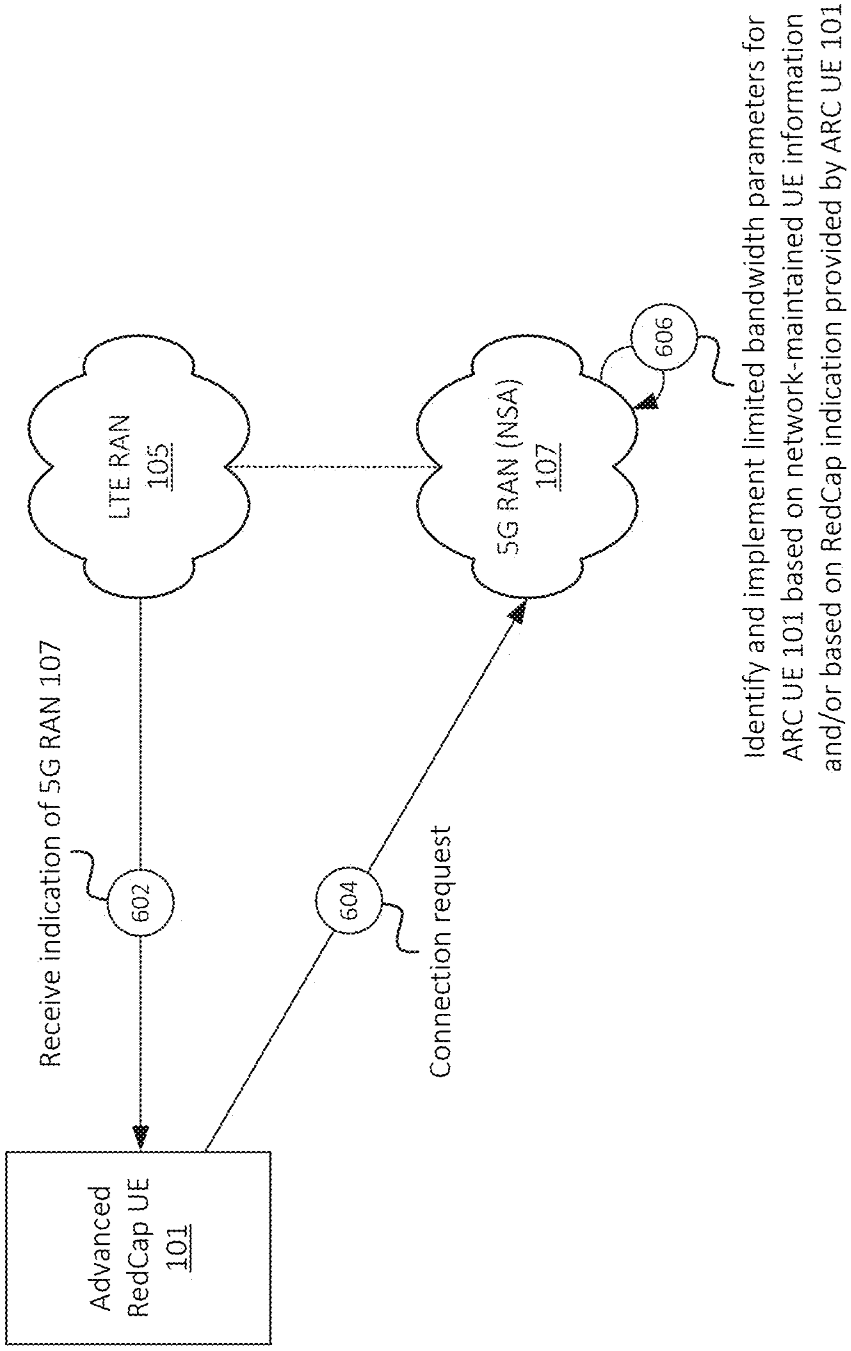
FIG. 6 illustrates an example of an Advanced RedCap UE connecting to one or more RANs that implement a Non-Standalone ("NSA") architecture, in accordance with some embodiments.

As shown in FIGS. 4-6, LTE RAN 105 and/or 5G RAN 107 (e.g., which implement an NSA architecture to provide LTE and/or 5G connectivity to ARC UE 101 and other UEs) may be configured to communicate with ARC UE 101 in accordance with limited radio hardware of ARC UE 101. As discussed above, the ability for ARC UE 101 to communicate with LTE RAN 105 may facilitate the connection of ARC UE 101 to 5G RAN 107, for which LTE RAN 105 serves as an anchor.

As shown in FIG. 4, Network Provisioning/Management System ("NPMS") 401 may provision ARC UE 101 as being associated with a RedCap category and/or an Enhanced RedCap category. As discussed above, the RedCap category may be associated with a particular set of parameters, thresholds, etc. (e.g., maximum quantity and/or type of 5G radio hardware 201), and NPMS 401 may verify, identify, or otherwise determine that ARC UE 101 meets such parameters, thresholds, etc. NPMS 401 may be associated with an owner, operator, administrator, etc. of 5G RAN 103, LTE RAN 105, and/or 5G RAN 107. The Enhanced RedCap category may indicate that ARC UE 101 additionally has LTE radio hardware 203 via which ARC UE 101 is able to communicate with LTE RAN 105. In some embodiments, the Enhanced RedCap category may also be associated with a particular set of parameters, thresholds, etc., such as a maximum quantity and/or type of LTE radio hardware 203.

In some embodiments, provisioning (at 402) ARC UE 101 may include identifying a quantity or type of LTE radio hardware 203 implemented by ARC UE 101. Additionally, or alternatively, provisioning ARC UE 101 may include identifying a maximum uplink and/or downlink bandwidth that is supported by LTE radio hardware 203 of ARC UE 101.

Based on provisioning (at 402) ARC UE 101 as being associated with a RedCap category and/or an Enhanced RedCap category, NPMS 401 may provide (at 404) an indication, to a UE information repository that is communicatively coupled to LTE RAN 105 and/or to 5G RAN 107, that ARC UE 101 is associated with a RedCap category and/or an Enhanced RedCap category. The indication may include an identifier of ARC UE 101, such as an International Mobile Station Equipment Identity ("IMEI") value, an International Mobile Subscriber Identity ("IMSI") value, a Mobile Directory Number ("MDN"), and/or some other suitable identifier of ARC UE 101. In some embodiments, indicating ARC UE 101 as being associated with an Enhanced RedCap category may include specifying parameters, thresholds, etc. associated with ARC UE 101. For example, NPMS 401 may provide (at 404) information indicating a maximum uplink and/or downlink bandwidth associated with ARC UE 101 (e.g., a maximum amount of wireless transmissions that ARC UE 101 is able to send and/or receive over a given timeframe).

In some embodiments, NPMS 401 may provide such indication to a Home Subscriber Server ("HSS") that is communicatively coupled to LTE RAN 105, to a Unified Data Management function ("UDM") or Unified Data Repository ("UDR") that is communicatively coupled to 5G RAN 107, to a device that implements an HSS as well as a UDM and/or a UDR (shown as "UDM/HSS 403"), and/or to some other suitable UE information repository.

The UE information repository may maintain (at 406) information associating ARC UE 101 with the RedCap category and/or the Enhanced RedCap category. Additionally, or alternatively, the UE information repository may maintain information including parameters, thresholds, etc. of ARC UE 101 (e.g., a quantity or type of LTE radio hardware 203, a maximum uplink and/or downlink throughput, etc.). In some embodiments, the UE information repository may include a UDM or a UDR that maintains information that ARC UE 101 is associated with a RedCap category. In some embodiments, the UE information repository may include an HSS that maintains information that ARC UE 101 is associated with a RedCap category or an Enhanced RedCap category. In some embodiments, the UE information repository may include a device or system other than a UDM or UDR (e.g., may include or may be implemented by an HSS associated with an Evolved Packet Core ("EPC") that is communicatively coupled to LTE RAN 105). For example, in some embodiments, a UE information repository that is communicatively coupled to 5G RAN 107 (e.g., a UDM, a UDR, etc.) may not maintain or receive an indication that ARC UE 101 is associated with the RedCap category or the Enhanced RedCap category.

As shown in FIG. 5, ARC UE 101 may receive, detect, etc. (at 502) one or more LTE system messages broadcasted by LTE RAN 105, such as MIBs, SIBs, etc. ARC UE 101 may detect such messages using, for example, LTE radio hardware 203 of ARC UE 101. ARC UE 101 (e.g., radio controller 205) may output (at 504) a connection request to LTE RAN 105 based on detecting LTE RAN 105 and/or one or more other factors. For example, radio controller 205 may output a connection to LTE RAN 105 based on signal strength or quality metrics between ARC UE 101 and LTE RAN 105 and/or other suitable factors. The connection request may include one or more RRC messages, NAS messages, etc. that are sent between ARC UE 101 and one or more elements of LTE RAN 105, such as an eNB, an access control element of LTE RAN 105 such as a Mobility Management Entity ("MME"), or the like. In some embodiments, the connection request may not include an indication that UE 101 is associated with a RedCap category and/or an Enhanced RedCap category. For example, in some embodiments, LTE RAN 105 may not be able to determine, based on the connection request itself (at 504), that ARC UE 101 is associated with a particular set of thresholds, parameters, etc. such as a maximum uplink and/or downlink throughput.

As part of establishing a connection (e.g., one or more radio bearers) between LTE RAN 105 and ARC UE 101, LTE RAN 105 may obtain (at 506) UE information from UDM/HSS 403 (e.g., an HSS, a device or system that implements an HSS and a UDM, and/or some other suitable source). The UE information may include, in some embodiments, an Enhanced RedCap indication and/or one or more parameters of ARC UE 101 such as a maximum uplink and/or downlink bandwidth supported by ARC UE 101 (e.g., limited bandwidth parameters for ARC UE 101). After establishing a connection with ARC UE 101, LTE RAN 105 may implement (at 508) limited bandwidth parameters or other suitable parameters for ARC UE 101 based on the received (at 506) UE information. For example, LTE RAN 105 may schedule, allocate, etc. radio resources of LTE RAN 105 in accordance with the limited bandwidth parameters of ARC UE 101, in order to efficiently utilize resources of LTE RAN 105 without overloading ARC UE 101 with more traffic than ARC UE 101 is capable of handling.

As shown in FIG. 6, ARC UE 101 may also receive (at 602) an indication of the presence of 5G RAN 107, which may implement an NSA architecture in conjunction with LTE RAN 105. For example, system messages broadcasted by LTE RAN 105 may include synchronization information, control information, and/or other information based on which ARC UE 101 may detect (e.g., using 5G radio hardware 201) 5G RAN 107. Additionally, or alternatively, ARC UE 101 may receive (at 602) information regarding 5G RAN 107 in some manner other than system messages broadcasted by LTE RAN 105. For example, after connecting to LTE RAN 105, ARC UE 101 may receive one or more control messages from LTE RAN 105, including information based on which ARC UE 101 may detect 5G RAN 107.

ARC UE 101 (e.g., radio controller 205) may use the received (at 602) information to output (at 604) a connection request to 5G RAN 107. In some embodiments, the connection request sent to 5G RAN 107 may include one or more RRC messages (e.g., between ARC UE 101 and a gNB of 5G RAN 107), NAS messages (e.g., between ARC UE 101 and an AMF associated with 5G RAN 107), etc. In some embodiments, the connection request may include a RedCap indication, based on which 5G RAN 107 may identify (at 606) limited bandwidth parameters for ARC UE 101. For example, as discussed above, 5G RAN 107 may maintain information associating the RedCap category with particular parameters, such as maximum uplink and/or downlink bandwidth or other suitable parameters that are in accordance with the RedCap category.

In some embodiments, the connection request 604 may not include a RedCap indication. In such embodiments, 5G RAN 107 (e.g., an access control element associated with 5G RAN 107, such as an AMF) may obtain or receive information from a UE information repository that is communicatively coupled to 5G RAN 107 (e.g., a UDM or a UDR), indicating that ARC UE 101 is associated with a RedCap category. 5G RAN 107 may implement particular bandwidth limits or other parameters when communicating with ARC UE 101 (e.g., may schedule or allocate resources accordingly) based on identifying that ARC UE 101 is associated with the RedCap category. In this manner, ARC UE 101 may be able to operate according to the RedCap category, and may further be enhanced to communicate with 5G RANs that implement an NSA architecture, in addition to 5G RANs that implement an SA architecture.

Figure 7:
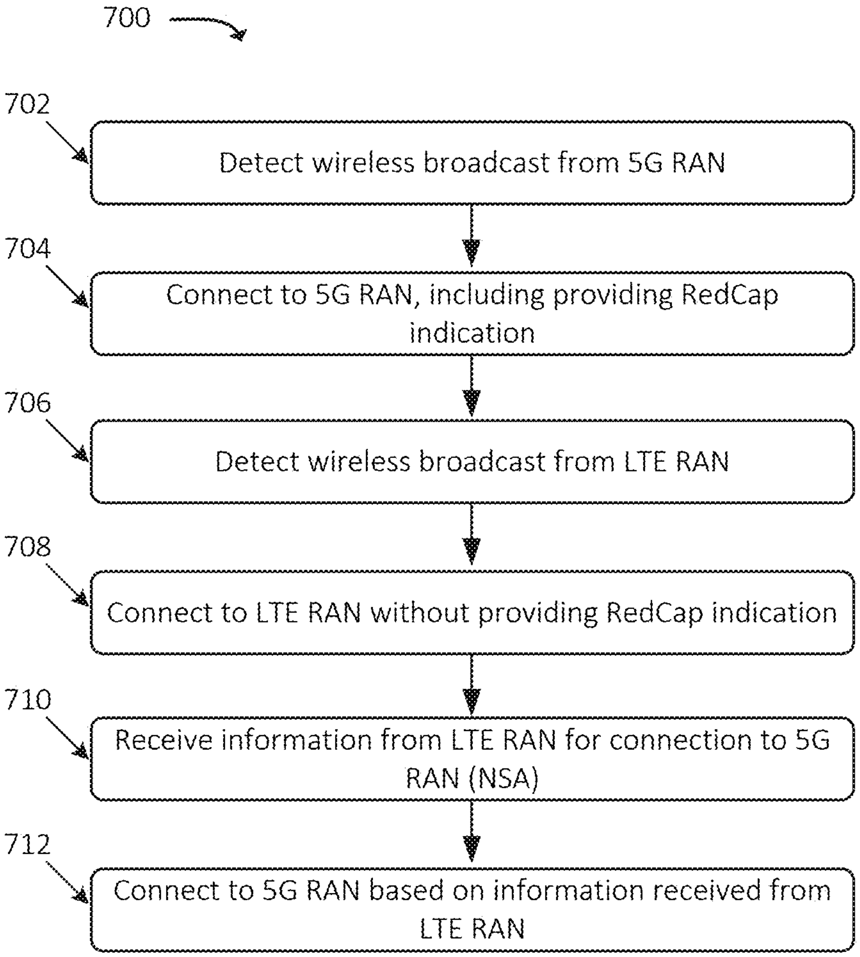
FIG. 7 illustrates an example process for connecting to one or more RANs by an Advanced RedCap UE, in accordance with some embodiments.

FIG. 7 illustrates an example process 700 for connecting to one or more RANs by an Advanced RedCap UE. In some embodiments, some or all of process 700 may be performed by ARC UE 101. Operations described below may be performed independently or in a different order than the example sequence shown in FIG. 7. Further, in some embodiments, ARC UE 101 may perform some portions of process 700, without performing other portions of process 700.

As shown, process 700 may include detecting (at 702) wireless broadcasts from 5G RAN 103. For example, ARC UE 101 may detect or otherwise receive SIBs, MIBs, and/or other information from 5G RAN 103, where such information is usable by ARC UE 101 (e.g., radio controller 205, via 5G radio hardware 201) to connect to 5G RAN 103.

Process 700 may further include connecting (at 704) to 5G RAN 103. As discussed above, connecting to 5G RAN 103 may include outputting a RedCap indication to one or more base stations (e.g., gNBs) of 5G RAN 103. For example, radio controller 205 of ARC UE 101 may identify that the wireless broadcasts are associated with a 5G RAT and, based on identifying the 5G wireless broadcasts, may determine that the RedCap indication should be sent as part of connecting to 5G RAN 103. Based on receiving the RedCap indication, 5G RAN 103 may allocate radio resources of 5G RAN 103 in accordance with bandwidth limits or other parameters that are associated with the RedCap indication.

Process 700 may additionally include detecting (at 706) wireless broadcasts from LTE RAN 105. For example, ARC UE 101 may detect or otherwise receive SIBs, MIBs, and/or other information from LTE RAN 105, where such information is usable by ARC UE 101 (e.g., radio controller 205, via LTE radio hardware 203) to connect to LTE RAN 105. ARC UE 101 may, for example, detect the wireless broadcasts from LTE RAN 105 while also being connected to 5G RAN 103, may detect the wireless broadcasts from LTE RAN 105 while also being connected to a different LTE RAN (and/or to a different base station of the same LTE RAN 105), or when not connected to any LTE RAN or 5G RAN.

Process 700 may also include connecting (at 708) to LTE RAN 105, based on receiving the wireless broadcasts from LTE RAN 105. In some embodiments, ARC UE 101 may forgo providing a RedCap indication to LTE RAN 105. As discussed above, LTE RAN 105 may determine a maximum uplink and/or downlink bandwidth associated with ARC UE 101 and/or other thresholds, parameters, etc. of ARC UE 101 based on network-maintained information associated with ARC UE 101. For example, a UE information repository such as an HSS may provide such network-maintained information as part of, or pursuant to, the connection of ARC UE 101 to LTE RAN 105. LTE RAN 105 may accordingly configure or schedule radio resources of LTE RAN 105 for wireless communications with ARC UE 101 based on such network-maintained information.

Process 700 may further include receiving (at 710) information from LTE RAN 105 that is associated with another 5G RAN 107. For example, LTE RAN 105 and 5G RAN 107 may implement an NSA architecture, in which LTE RAN 105 serves as an anchor for 5G RAN 107. Serving as an anchor may include, for example, outputting information to ARC UE 101 and/or to other UEs based on which such UEs may detect and/or connect to 5G RAN 107. For example, 5G RAN 107 may forgo broadcasting system messages in the NSA architecture, in some embodiments.

In some embodiments, receiving (at 710) the information from LTE RAN 105 may occur without connecting to LTE RAN 105 (e.g., the information may be broadcasted by LTE RAN 105). In some embodiments, ARC UE 101 may receive the information from LTE RAN 105 after connecting to LTE RAN 105.

Process 700 may additionally include connecting (at 712) to 5G RAN 107 based on the information received from LTE RAN 105. As discussed above, connecting to 5G RAN 107 may, in some embodiments, include providing a RedCap indication to 5G RAN 107, based on which 5G RAN 107 may configure, allocate, etc. radio resources in accordance with thresholds, limits, etc. associated with the RedCap indication. On the other hand, in some embodiments, connecting to 5G RAN 107 may include not providing the RedCap indication to 5G RAN 107. For example, as discussed above, 5G RAN 107 may identify such thresholds, limits, etc. based on network-maintained UE information associated with ARC UE 101 (e.g., as maintained and provided by a UDM, UDR, and/or some other suitable UE information repository) as part of or pursuant to the connection of ARC UE 101 to 5G RAN 107.

Figure 8:
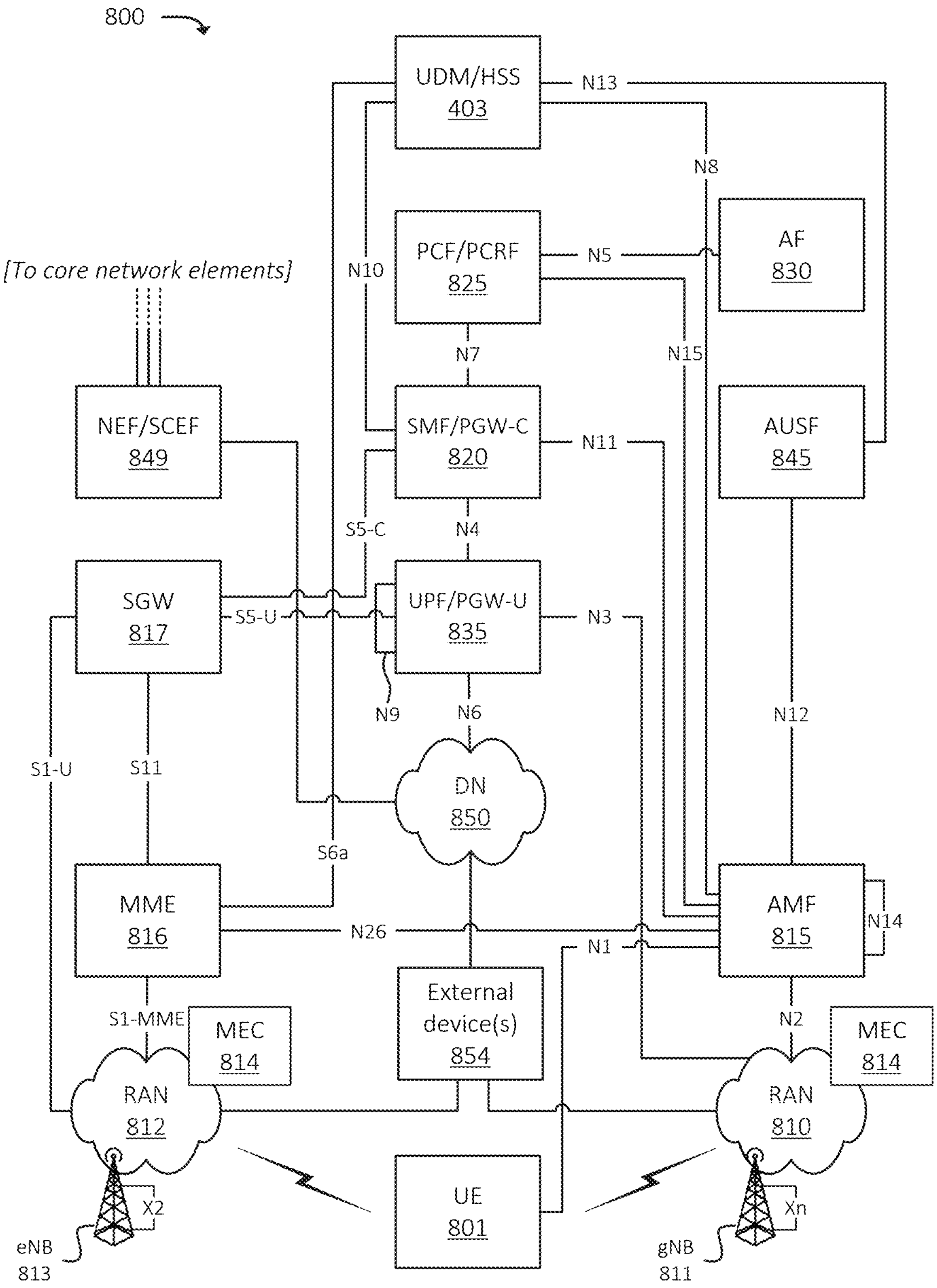
FIGS. 8 and 9 illustrate example environments in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G NSA architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an EPC). In some embodiments, portions of environment 800 may represent or may include a 5G core ("5GC"). As shown, environment 800 may include UE 801, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, UDM/HSS 403, Authentication Server Function ("AUSF") 845, and Network Exposure Function ("NEF")/Service Capability Exposure Function ("SCEF") 849. Environment 800 may also include one or more networks, such as Data Network ("DN") 850. Environment 800 may include one or more additional devices or systems communicatively coupled to one or more networks (e.g., DN 850), such as one or more external devices 854.

The example shown in FIG. 8 illustrates one instance of each network component or function (e.g., one instance of SMF/PGW-C 820, PCF/PCRF 825, UPF/PGW-U 835, UDM/HSS 403, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 815, SMF/PGW-C 820, PCF/PCRF 825, and/or UPF/PGW-U 835, while another slice may include a second instance of AMF 815, SMF/PGW-C 820, PCF/PCRF 825, and/or UPF/PGW-U 835). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Additionally, one or more elements of environment 800 may be implemented in a virtualized and/or containerized manner. For example, one or more of the elements of environment 800 may be implemented by one or more Virtualized Network Functions ("VNFs"), Cloud-Native Network Functions ("CNFs"), etc. In such embodiments, environment 800 may include, may implement, and/or may be communicatively coupled to an orchestration platform that provisions hardware resources, installs containers or applications, performs load balancing, and/or otherwise manages the deployment of such elements of environment 800. In some embodiments, such orchestration and/or management of such elements of environment 800 may be performed by, or in conjunction with, the open-source Kubernetes® application programming interface ("API") or some other suitable virtualization, containerization, and/or orchestration system.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 801 may send traffic to and/or receive traffic (e.g., user plane traffic) from DN 850 via RAN 810, RAN 812, and/or UPF/PGW-U 835. In some embodiments, UE 801 may include, may implement, or may be implemented by ARC UE 101.

RAN 810 may be, or may include, a 5G RAN that implements a 5G RAT and that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., user plane traffic such as voice call traffic, data traffic, messaging traffic, etc.) from UE 801 via the air interface, and may communicate the traffic to UPF/PGW-U 835 and/or one or more other devices or networks. Further, RAN 810 may receive signaling traffic, control plane traffic, etc. from UE 801 via the air interface, and may communicate such signaling traffic, control plane traffic, etc. to AMF 815 and/or one or more other devices or networks. Additionally, RAN 810 may receive traffic intended for UE 801 (e.g., from UPF/PGW-U 835, AMF 815, and/or one or more other devices or networks) and may communicate the traffic to UE 801 via the air interface. In some embodiments, RAN 810 may be, may include, and/or may be implemented by 5G RAN 107.

RAN 812 may be, or may include, an LTE RAN that implements an LTE RAT and that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 801 via the air interface, and may communicate the traffic to UPF/PGW-U 835 (e.g., via SGW 817) and/or one or more other devices or networks. Further, RAN 812 may receive signaling traffic, control plane traffic, etc. from UE 801 via the air interface, and may communicate such signaling traffic, control plane traffic, etc. to MME 816 and/or one or more other devices or networks. Additionally, RAN 812 may receive traffic intended for UE 801 (e.g., from UPF/PGW-U 835, MME 816, SGW 817, and/or one or more other devices or networks) and may communicate the traffic to UE 801 via the air interface. In some embodiments, RAN 812 may be, may include, and/or may be implemented by LTE RAN 105.

One or more RANs of environment 800 (e.g., RAN 810 and/or RAN 812) may include, may implement, and/or may otherwise be communicatively coupled to one or more edge computing devices, such as one or more Multi-Access/Mobile Edge Computing ("MEC") devices (referred to sometimes herein simply as "MECs") 814. MECs 814 may be co-located with wireless network infrastructure equipment of RANs 810 and/or 812 (e.g., one or more gNBs 811 and/or one or more eNBs 813, respectively). Additionally, or alternatively, MECs 814 may otherwise be associated with geographical regions (e.g., coverage areas) of wireless network infrastructure equipment of RANs 810 and/or 812. In some embodiments, one or more MECs 814 may be implemented by the same set of hardware resources, the same set of devices, etc. that implement wireless network infrastructure equipment of RANs 810 and/or 812. In some embodiments, one or more MECs 814 may be implemented by different hardware resources, a different set of devices, etc. from hardware resources or devices that implement wireless network infrastructure equipment of RANs 810 and/or 812. In some embodiments, MECs 814 may be communicatively coupled to wireless network infrastructure equipment of RANs 810 and/or 812 (e.g., via a high-speed and/or low-latency link such as a physical wired interface, a high-speed and/or low-latency wireless interface, or some other suitable communication pathway).

MECs 814 may include hardware resources (e.g., configurable or provisionable hardware resources) that may be configured to provide services and/or otherwise process traffic to and/or from UE 801, via RAN 810 and/or 812. For example, RAN 810 and/or 812 may route some traffic from UE 801 (e.g., traffic associated with one or more particular services, applications, application types, etc.) to a respective MEC 814 instead of to core network elements of environment 800 (e.g., UPF/PGW-U 835). MEC 814 may accordingly provide services to UE 801 by processing such traffic, performing one or more computations based on the received traffic, and providing traffic to UE 801 via RAN 810 and/or 812. MEC 814 may include, and/or may implement, some or all of the functionality described above with respect to UPF/PGW-U 835, AF 830, one or more application servers, and/or one or more other devices, systems, VNFs, CNFs, etc. In this manner, ultra-low latency services may be provided to UE 801, as traffic does not need to traverse links (e.g., backhaul links) between RAN 810 and/or 812 and the core network.

AMF 815 may include one or more devices, systems, VNFs, CNFs, etc., that perform operations to register UE 801 with the 5G network, to establish bearer channels associated with a session with UE 801, to hand off UE 801 from the 5G network to another network, to hand off UE 801 from the other network to the 5G network, to manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, to manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communication sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple instances of UPF/PGW-U 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 403 and AUSF 845 may include one or more devices, systems, VNFs, CNFs, etc., that manage, update, and/or store, in one or more memory devices associated with AUSF 845 and/or UDM/HSS 403, profile information associated with a subscriber. In some embodiments, UDM/HSS 403 may include, may implement, may be communicatively coupled to, and/or may otherwise be associated with some other type of repository or database, such as a Unified Data Repository ("UDR"). AUSF 845 and/or UDM/HSS 403 may perform authentication, authorization, and/or accounting operations associated with one or more UEs 801 and/or one or more communication sessions associated with one or more UEs 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

External devices 854 may include one or more devices or systems that communicate with UE 801 via DN 850 and one or more elements of environment 800 (e.g., via UPF/PGW-U 835). In some embodiments, external devices 854 may include, may implement, and/or may otherwise be associated with NPMS 401. External devices 854 may include, for example, one or more application servers, content provider systems, web servers, or the like. External devices 854 may, for example, implement "server-side" applications that communicate with "client-side" applications executed by UE 801. External devices 854 may provide services to UE 801 such as gaming services, videoconferencing services, messaging services, email services, web services, and/or other types of services.

In some embodiments, external devices 854 may communicate with one or more elements of environment 800 (e.g., core network elements) via NEF/SCEF 849. NEF/SCEF 849 may include one or more devices, systems, VNFs, CNFs, etc. that provide access to information, APIs, and/or other operations or mechanisms of one or more core network elements to devices or systems that are external to the core network (e.g., to external device 854 via DN 850). NEF/SCEF 849 may maintain authorization and/or authentication information associated with such external devices or systems, such that NEF/SCEF 849 is able to provide information, that is authorized to be provided, to the external devices or systems. For example, a given external device 854 may request particular information associated with one or more core network elements. NEF/SCEF 849 may authenticate the request and/or otherwise verify that external device 854 is authorized to receive the information, and may request, obtain, or otherwise receive the information from the one or more core network elements. In some embodiments, NEF/SCEF 849 may include, may implement, may be implemented by, may be communicatively coupled to, and/or may otherwise be associated with a Security Edge Protection Proxy ("SEPP"), which may perform some or all of the functions discussed above. External device 854 may, in some situations, subscribe to particular types of requested information provided by the one or more core network elements, and the one or more core network elements may provide (e.g., "push") the requested information to NEF/SCEF 849 (e.g., on a periodic or otherwise ongoing basis).

In some embodiments, external devices 854 may communicate with one or more elements of RAN 810 and/or 812 via an API or other suitable interface. For example, a given external device 854 may provide instructions, requests, etc. to RAN 810 and/or 812 to provide one or more services via one or more respective MECs 814. In some embodiments, such instructions, requests, etc. may include QoS parameters, Service Level Agreements ("SLAs"), etc. (e.g., maximum latency thresholds, minimum throughput thresholds, etc.) associated with the services.

Figure 9:
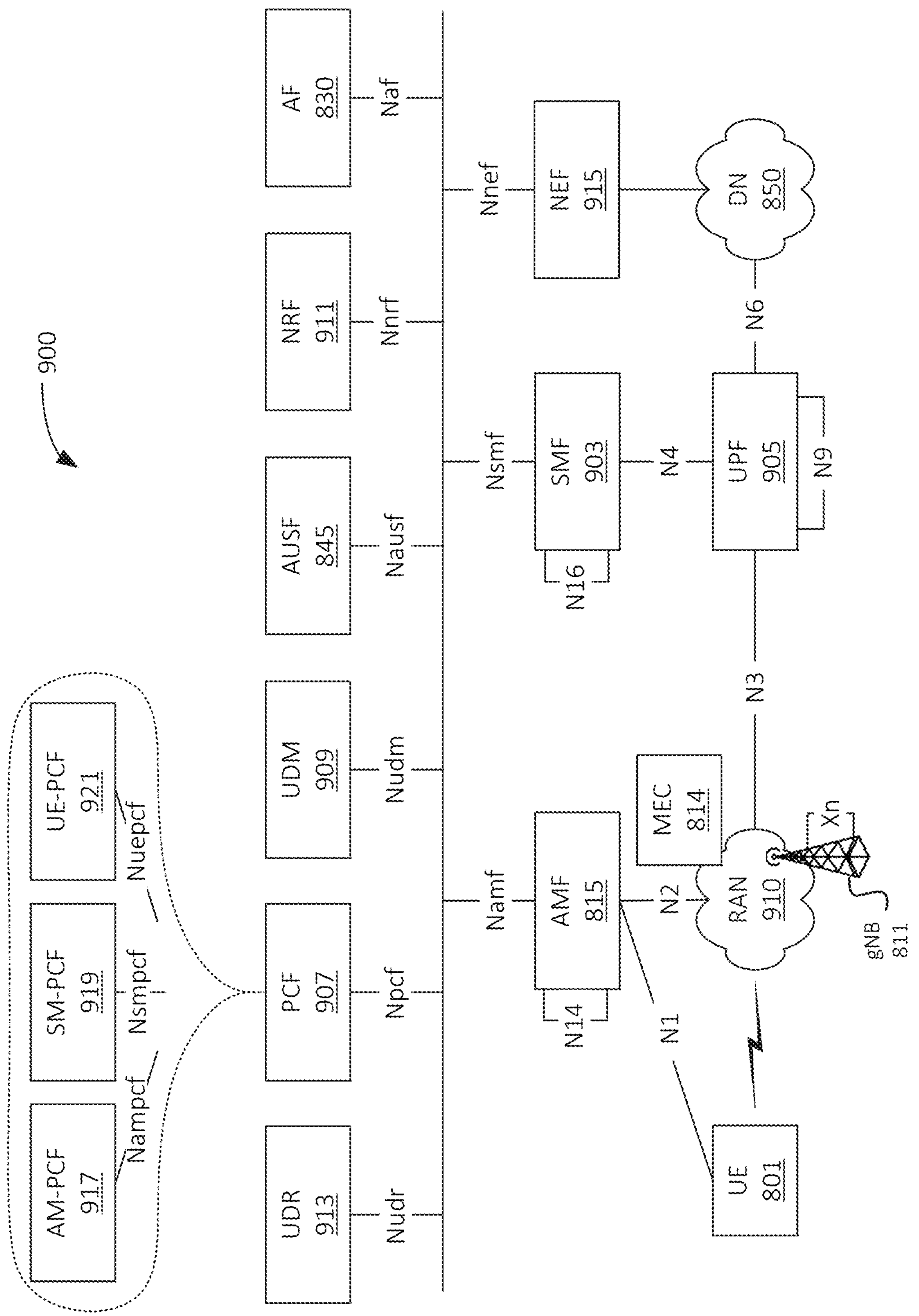

FIG. 9 illustrates another example environment 900, in which one or more embodiments may be implemented. In some embodiments, environment 900 may correspond to a 5G network, and/or may include elements of a 5G network. In some embodiments, environment 900 may correspond to a 5G SA architecture. In some embodiments, environment 900 may include a 5GC, in which 5GC network elements perform one or more operations described herein.

As shown, environment 900 may include UE 801, RAN 910 (which may include one or more gNBs 811 or other types of wireless network infrastructure) and various network functions, which may be implemented as VNFs, CNFs, etc. Such network functions may include AMF 815, SMF 903, UPF 905, PCF 907, UDM 909, AUSF 845, Network Repository Function ("NRF") 911, AF 830, UDR 913, and NEF 915. Environment 900 may also include or may be communicatively coupled to one or more networks, such as DN 850. In some embodiments, RAN 910 may be, may include, and/or may be implemented by 5G RAN 103.

The example shown in FIG. 9 illustrates one instance of each network component or function (e.g., one instance of SMF 903, UPF 905, PCF 907, UDM 909, AUSF 845, etc.). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF 903, PCF 907, UPF 905, etc., while another slice may include a second instance of SMF 903, PCF 907, UPF 905, etc.). Additionally, or alternatively, one or more of the network functions of environment 900 may implement multiple network slices. The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Elements of environment 900 may interconnect with each other and/or other devices via wired connections, wireless connections, or a combination of wired and wireless connections. Examples of interfaces or communication pathways between the elements of environment 900, as shown in FIG. 9, may include interfaces shown in FIG. 9 and/or one or more interfaces not explicitly shown in FIG. 9. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 900 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 815), an Nudm interface (e.g., indicating communications to be routed to UDM 909), an Npcf interface, an Nupf interface, an Nnef interface, an Nsmf interface, an Nnrf interface, an Nudr interface, an Naf interface, and/or one or more other SBIs.

UPF 905 may include one or more devices, systems, VNFs, CNFs, etc., that receive, route, process, and/or forward traffic (e.g., user plane traffic). As discussed above, UPF 905 may communicate with UE 801 via one or more communication sessions, such as PDU sessions. Such PDU sessions may be associated with a particular network slice or other suitable QoS parameters, as noted above. UPF 905 may receive downlink user plane traffic (e.g., voice call traffic, data traffic, etc. destined for UE 801) from DN 850, and may forward the downlink user plane traffic toward UE 801 (e.g., via RAN 910). In some embodiments, multiple UPFs 905 may be deployed (e.g., in different geographical locations), and the delivery of content to UE 801 may be coordinated via the N9 interface. Similarly, UPF 905 may receive uplink traffic from UE 801 (e.g., via RAN 910), and may forward the traffic toward DN 850. In some embodiments, UPF 905 may implement, may be implemented by, may be communicatively coupled to, and/or may otherwise be associated with UPF/PGW-U 835. In some embodiments, UPF 905 may communicate (e.g., via the N4 interface) with SMF 903, regarding user plane data processed by UPF 905 (e.g., to provide analytics or reporting information, to receive policy and/or authorization information, etc.).

PCF 907 may include one or more devices, systems, VNFs, CNFs, etc., that aggregate, derive, generate, etc. policy information associated with the 5GC and/or UEs 801 that communicate via the 5GC and/or RAN 910. PCF 907 may receive information regarding policies and/or subscriptions from one or more sources, such as subscriber databases (e.g., UDM 909, UDR 913, etc.), and/or from one or more users such as, for example, an administrator associated with PCF 907. In some embodiments, the functionality of PCF 907 may be split into multiple network functions or subsystems, such as access and mobility PCF ("AM-PCF") 917, session management PCF ("SM-PCF") 919, UE PCF ("UE-PCF") 921, and so on. Such different "split" PCFs may be associated with respective SBIs (e.g., AM-PCF 917 may be associated with an Nampcf SBI, SM-PCF 919 may be associated with an Nsmpcf SBI, UE-PCF 921 may be associated with an Nuepcf SBI, and so on) via which other network functions may communicate with the split PCFs. The split PCFs may maintain information regarding policies associated with different devices, systems, and/or network functions.

NRF 911 may include one or more devices, systems, VNFs, CNFs, etc. that maintain routing and/or network topology information associated with the 5GC. For example, NRF 911 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 913 may include one or more devices, systems, VNFs, CNFs, etc. that provide user and/or subscriber information, based on which PCF 907 and/or other elements of environment 900 may determine access policies, QoS policies, charging policies, or the like. In some embodiments, UDR 913 may receive such information from UDM 909 and/or one or more other sources.

NEF 915 may include one or more devices, systems, VNFs, CNFs, etc. that provide access to information, APIs, and/or other operations or mechanisms of the 5GC to devices or systems that are external to the 5GC. NEF 915 may maintain authorization and/or authentication information associated with such external devices or systems, such that NEF 915 is able to provide information, that is authorized to be provided, to the external devices or systems. Such information may be received from other network functions of the 5GC (e.g., as authorized by an administrator or other suitable entity associated with the 5GC), such as SMF 903, UPF 905, a charging function ("CHF") of the 5GC, and/or other suitable network function. NEF 915 may communicate with external devices or systems (e.g., external devices 854) via DN 850 and/or other suitable communication pathways.

While environment 900 is described in the context of a 5GC, as noted above, environment 900 may, in some embodiments, include or implement one or more other types of core networks. For example, in some embodiments, environment 900 may be or may include a converged packet core, in which one or more elements may perform some or all of the functionality of one or more 5GC network functions and/or one or more EPC network functions. For example, in some embodiments, AMF 815 may include, may implement, may be implemented by, and/or may otherwise be associated with MME 816; SMF 903 may include, may implement, may be implemented by, and/or may otherwise be associated with SGW 817; PCF 907 may include, may implement, may be implemented by, and/or may otherwise be associated with a PCRF (e.g., PCF/PCRF 825); NEF 915 may include, may implement, may be implemented by, and/or may otherwise be associated with a SCEF (e.g., NEF/SCEF 849); and so on.

Figure 10:
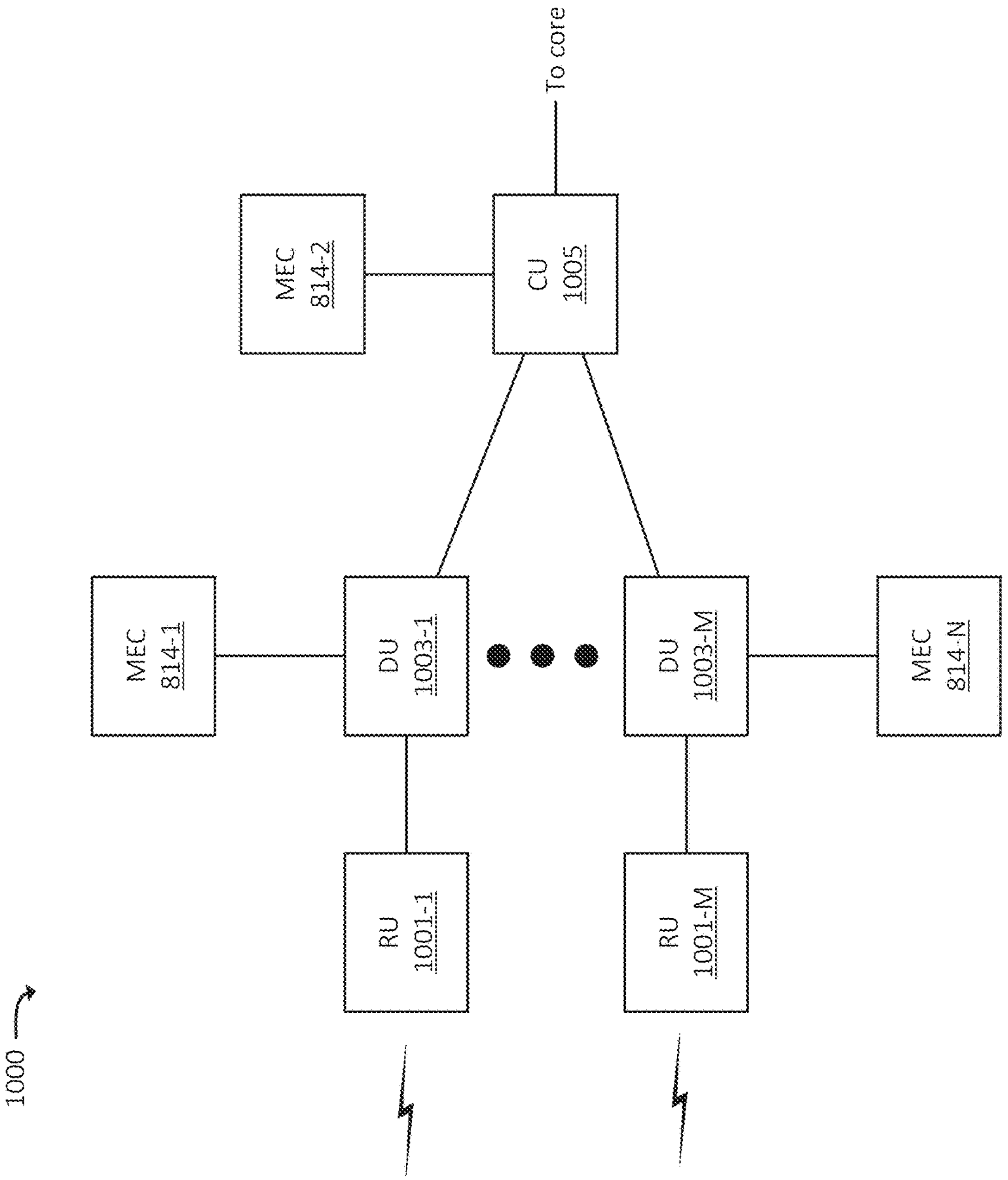
FIG. 10 illustrates an example arrangement of a RAN, in accordance with some embodiments.

FIG. 10 illustrates an example RAN environment 1000, which may be included in and/or implemented by one or more RANs (e.g., RAN 810, RAN 910, or some other RAN). In some embodiments, a particular RAN 810 and/or RAN 910 may include one RAN environment 1000. In some embodiments, a particular RAN 810 and/or RAN 910 may include multiple RAN environments 1000. In some embodiments, RAN environment 1000 may correspond to a particular gNB 811 of RAN 810 and/or RAN 910. In some embodiments, RAN environment 1000 may correspond to multiple gNBs 811. In some embodiments, RAN environment 1000 may correspond to one or more other types of base stations of one or more other types of RANs. As shown, RAN environment 1000 may include Central Unit ("CU") 1005, one or more Distributed Units ("DUs") 1003-1 through 1003-M (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 815 and/or UPF 905) and/or some other device or system such as MEC 814. In the uplink direction (e.g., for traffic from UEs 801 to a core network), CU 1005 may aggregate traffic from DUs 1003, and forward the aggregated traffic to the core network. In some embodiments, CU 1005 may receive traffic according to a given protocol (e.g., Radio Link Control ("RLC") traffic) from DUs 1003, and may perform higher-layer processing (e.g., may aggregate/process RLC packets and generate Packet Data Convergence Protocol ("PDCP") packets based on the RLC packets) on the traffic received from DUs 1003.

CU 1005 may receive downlink traffic (e.g., traffic from the core network, traffic from a given MEC 814, etc.) for a particular UE 801, and may determine which DU(s) 1003 should receive the downlink traffic. DU 1003 may include one or more devices that transmit traffic between a core network (e.g., via CU 1005) and UE 801 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 801.

RU 1001 may include hardware circuitry (e.g., one or more RF transceivers, antennas, radios, and/or other suitable hardware) to communicate wirelessly (e.g., via an RF interface) with one or more UEs 801, one or more other DUs 1003 (e.g., via RUs 1001 associated with DUs 1003), and/or any other suitable type of device. In the uplink direction, RU 1001 may receive traffic from UE 801 and/or another DU 1003 via the RF interface and may provide the traffic to DU 1003. In the downlink direction, RU 1001 may receive traffic from DU 1003, and may provide the traffic to UE 801 and/or another DU 1003.

One or more elements of RAN environment 1000 may, in some embodiments, be communicatively coupled to one or more MECs 814. For example, DU 1003-1 may be communicatively coupled to MEC 814-1, DU 1003-M may be communicatively coupled to MEC 814-N, CU 1005 may be communicatively coupled to MEC 814-2, and so on. MECs 814 may include hardware resources (e.g., configurable or provisionable hardware resources) that may be configured to provide services and/or otherwise process traffic to and/or from UE 801, via a respective RU 1001.

For example, DU 1003-1 may route some traffic, from UE 801, to MEC 814-1 instead of to a core network via CU 1005. MEC 814-1 may process the traffic, perform one or more computations based on the received traffic, and may provide traffic to UE 801 via RU 1001-1. As discussed above, MEC 814 may include, and/or may implement, some or all of the functionality described above with respect to UPF 905, AF 830, and/or one or more other devices, systems, VNFs, CNFs, etc. In this manner, ultra-low latency services may be provided to UE 801, as traffic does not need to traverse DU 1003, CU 1005, links between DU 1003 and CU 1005, and an intervening backhaul network between RAN environment 1000 and the core network.

Figure 11:
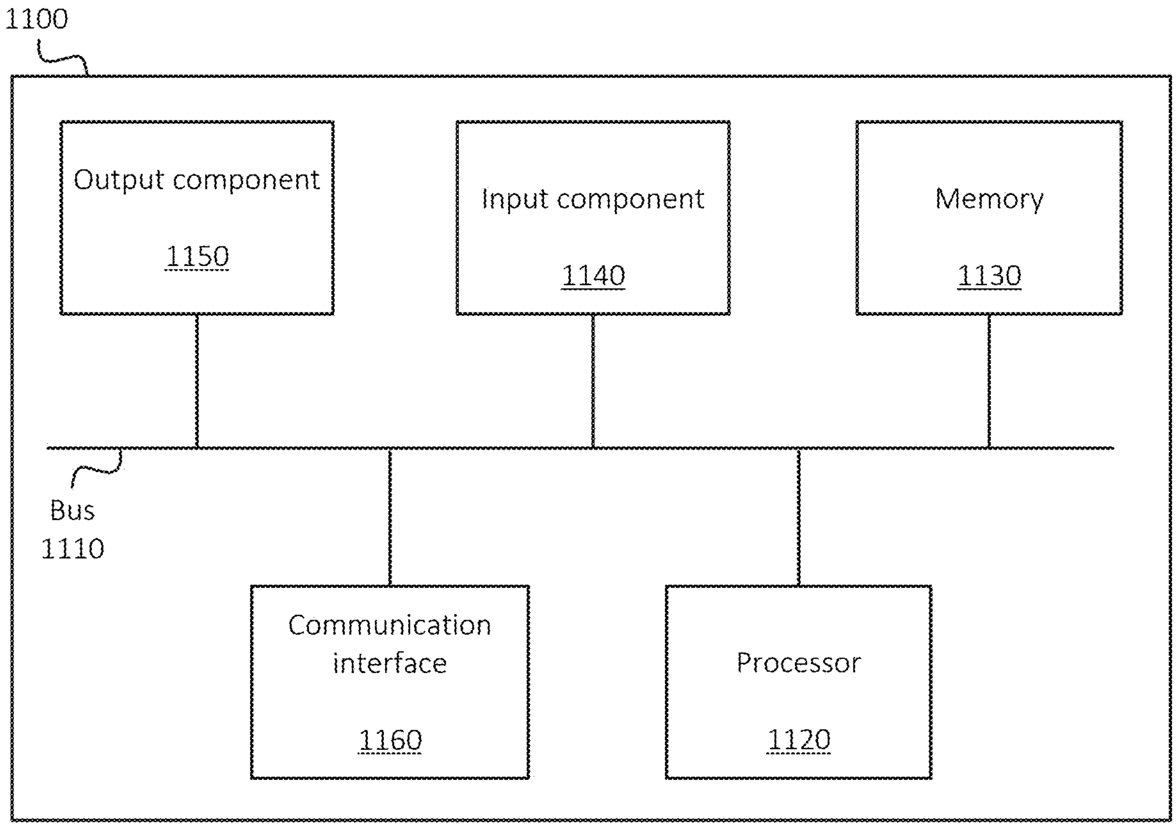
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, a set of provisioned hardware resources of a cloud computing system, or other suitable type of hardware that interprets and/or executes instructions (e.g., processor-executable instructions). In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or otherwise receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems (e.g., via RAN 810, RAN 812, DN 850, etc.). For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1100 may include more than one communication interface 1160. For instance, device 1100 may include an optical interface, a wireless interface, an Ethernet interface, and/or one or more other interfaces.

Device 1100 may perform certain operations relating to one or more processes described above. Device 1100 may perform these operations in response to processor 1120 executing instructions, such as software instructions, processor-executable instructions, etc. stored in a computer-readable medium, such as memory 1130. A computer-readable medium may be defined as a non-transitory memory device. A memory device may include space within a single physical memory device or spread across multiple physical memory devices. The instructions may be read into memory 1130 from another computer-readable medium or from another device. The instructions stored in memory 1130 may be processor-executable instructions that cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information. No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

a first set of wireless communication hardware that operates according to a first radio access technology ("RAT");

a second set of wireless communication hardware that operates according to a second RAT;

one or more processors configured to:

detect a first wireless broadcast, via the first set of wireless communication hardware, that has been transmitted by a first base station associated with the first RAT;

output a first connection request to the first base station, wherein the first connection request includes a Reduced Capability ("RedCap") indication;

connect, based on the first connection request, to the first base station, wherein the first base station implements a first set of radio resource allocation parameters for communications with the device based on the RedCap indication;

detect a second wireless broadcast, via the second set of wireless communication hardware, that has been transmitted by a second base station associated with the second RAT;

output a second connection request to the second base station without providing a RedCap indication to the second base station;

connect, based on the second connection request, to the second base station, wherein the second base station identifies a second set of radio resource allocation parameters for communications with the device based on network-maintained information associated with the device;

receive, from the second base station and after connecting to the second base station, control information associated with a third base station that is associated with the first RAT; and connect to the third base station, via the first set of wireless communication hardware, using the control information received from the second base station.

2. The device of claim 1, wherein the RedCap indication is associated with a maximum bandwidth, wherein the first set of radio resource allocation parameters are determined based on the maximum bandwidth.

3. The device of claim 1, wherein the second base station receives the network-maintained information from a Home Subscriber Server ("HSS").

4. The device of claim 1, wherein the network-maintained information includes information indicating a maximum bandwidth associated with the device.

5. The device of claim 1, wherein the first RAT includes a Fifth Generation ("5G") RAT, and wherein the second RAT includes a Long-Term Evolution ("LTE") RAT.

6. The device of claim 1, wherein the second base station and the third base station implement a 5G Non-Standalone ("NSA") architecture in which the second base station is an anchor for the third base station.

7. A non-transitory computer-readable medium, storing a plurality of processor-executable instructions, which, when executed by one or more processors of a device, cause the one or more processors to:

detect a first wireless broadcast, via a first set of wireless communication hardware of the device, that has been transmitted by a first base station associated with a first radio access technology ("RAT");

output a first connection request to the first base station, wherein the first connection request includes a Reduced Capability ("RedCap") indication;

connect, based on the first connection request, to the first base station, wherein the first base station implements a first set of radio resource allocation parameters for communications with the device based on the RedCap indication;

detect a second wireless broadcast, via a second set of wireless communication hardware of the device, that has been transmitted by a second base station associated with a second RAT;

output a second connection request to the second base station without providing a RedCap indication to the second base station;

connect, based on the second connection request, to the second base station, wherein the second base station identifies a second set of radio resource allocation parameters for communications with the device based on network-maintained information associated with the device;

receive, from the second base station and after connecting to the second base station, control information associated with a third base station that is associated with the first RAT; and connect to the third base station, via the first set of wireless communication hardware, using the control information received from the second base station.

8. The non-transitory computer-readable medium of claim 7, wherein the RedCap indication is associated with a maximum bandwidth, wherein the first set of radio resource allocation parameters are determined based on the maximum bandwidth.

9. The non-transitory computer-readable medium of claim 7, wherein the second base station receives the network-maintained information from a Home Subscriber Server ("HSS").

10. The non-transitory computer-readable medium of claim 7, wherein the network-maintained information includes information indicating a maximum bandwidth associated with the device.

11. The non-transitory computer-readable medium of claim 7, wherein the first RAT includes a Fifth Generation ("5G") RAT, and wherein the second RAT includes a Long-Term Evolution ("LTE") RAT.

12. The non-transitory computer-readable medium of claim 7, wherein the second base station and the third base station implement a 5G Non-Standalone ("NSA") architecture in which the second base station is an anchor for the third base station.

13. A method performed by a device, the method comprising:

detecting a first wireless broadcast, via a first set of wireless communication hardware of the device, that has been transmitted by a first base station associated with a first radio access technology ("RAT");

outputting a first connection request to the first base station, wherein the first connection request includes a Reduced Capability ("RedCap") indication;

connecting, based on the first connection request, to the first base station, wherein the first base station implements a first set of radio resource allocation parameters for communications with the device based on the RedCap indication;

detecting a second wireless broadcast, via a second set of wireless communication hardware of the device, that has been transmitted by a second base station associated with a second RAT;

outputting a second connection request to the second base station without providing a RedCap indication to the second base station;

connecting, based on the second connection request, to the second base station, wherein the second base station identifies a second set of radio resource allocation parameters for communications with the device based on network-maintained information associated with the device;

receiving, from the second base station and after connecting to the second base station, control information associated with a third base station that is associated with the first RAT; and connecting to the third base station, via the first set of wireless communication hardware, using the control information received from the second base station.

14. The method of claim 13, wherein the RedCap indication is associated with a maximum bandwidth, wherein the first set of radio resource allocation parameters are determined based on the maximum bandwidth.

15. The method of claim 13, wherein the second base station receives the network-maintained information from a Home Subscriber Server ("HSS").

16. The method of claim 13, wherein the network-maintained information includes information indicating a maximum bandwidth associated with the device.

17. The method of claim 13, wherein the first RAT includes a Fifth Generation ("5G") RAT, and wherein the second RAT includes a Long-Term Evolution ("LTE") RAT.

18. The method of claim 13, wherein the second base station and the third base station implement a 5G Non-Standalone ("NSA") architecture in which the second base station is an anchor for the third base station.

19. The method of claim 13, wherein the control information associated with the third base station is third control information, wherein the first wireless broadcast includes first control information broadcasted by the first base station, wherein the second wireless broadcast includes second control information broadcasted by the second base station, and wherein the third base station does not broadcast the third control information.

20. The device of claim 1, wherein the control information associated with the third base station is third control information, wherein the first wireless broadcast includes first control information broadcasted by the first base station, wherein the second wireless broadcast includes second control information broadcasted by the second base station, and wherein the third base station does not broadcast the third control information.

21. The non-transitory computer-readable medium of claim 7, wherein the control information associated with the third base station is third control information, wherein the first wireless broadcast includes first control information broadcasted by the first base station, wherein the second wireless broadcast includes second control information broadcasted by the second base station, and wherein the third base station does not broadcast the third control information.

* * * * *